Sept. 5, 1950  J. F. CAVANAGH  2,520,997
BAKING UNIT
Filed May 1, 1947  3 Sheets-Sheet 1

Inventor
JOHN F. CAVANAGH
By Geo. B. Rawlings
Attorney

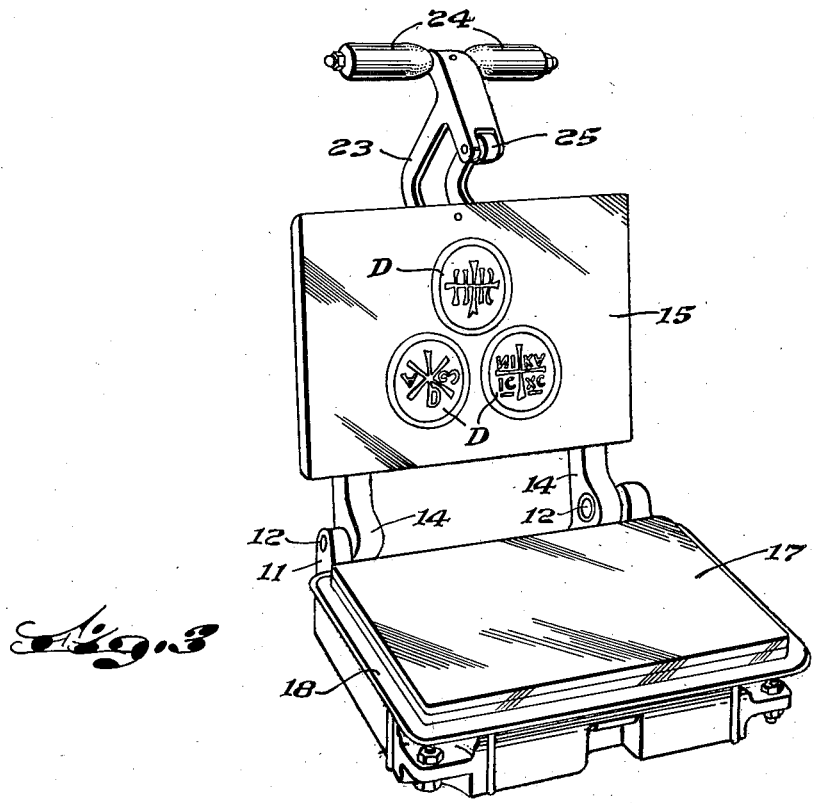
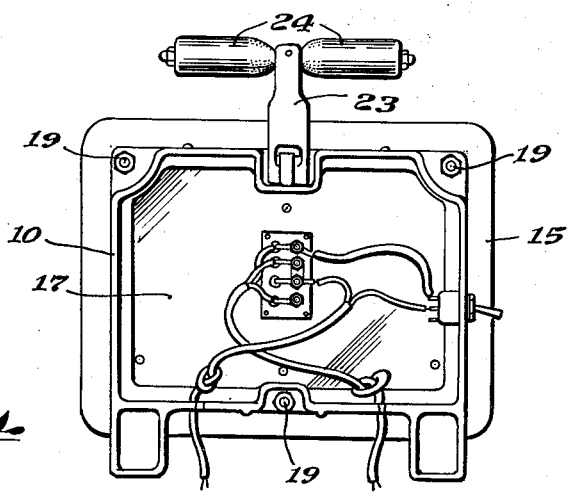

Inventor
JOHN F. CAVANAGH
By Geo B Rawlings
Attorney

Patented Sept. 5, 1950

2,520,997

UNITED STATES PATENT OFFICE 2,520,997

BAKING UNIT

John F. Cavanagh, Providence, R. I.

Application May 1, 1947, Serial No. 745,152

6 Claims. (Cl. 99—372)

This invention relates to baking units of the order of electric waffle irons, and although not limited to such use is especially adapted for the production of communion or altar bread as distributed in certain Christian churches.

One object is an efficient baking unit of lightweight, compact design.

Another object is a baking unit which is extremely simple to operate and which, if desired, may be operated by one hand for opening, closing and locking the same.

A further object is a baking unit of attractive design and durable finish in which the adjustable parts thereof may be permanently and accurately adjusted.

A still further object is a baking unit which will produce communion or altar bread containing traditionally symbolic designs.

A still further object is a baking unit having simple high and low heat adjustments with suitable thermometer control.

Other objects and advantages of my invention will appear as this description proceeds.

In the accompanying drawing wherein I have shown a preferred embodiment of my invention:

Figure 3 is a perspective view showing my baking unit in its open position.

Figure 4 is a bottom plan view of my baking unit.

Figure 1:
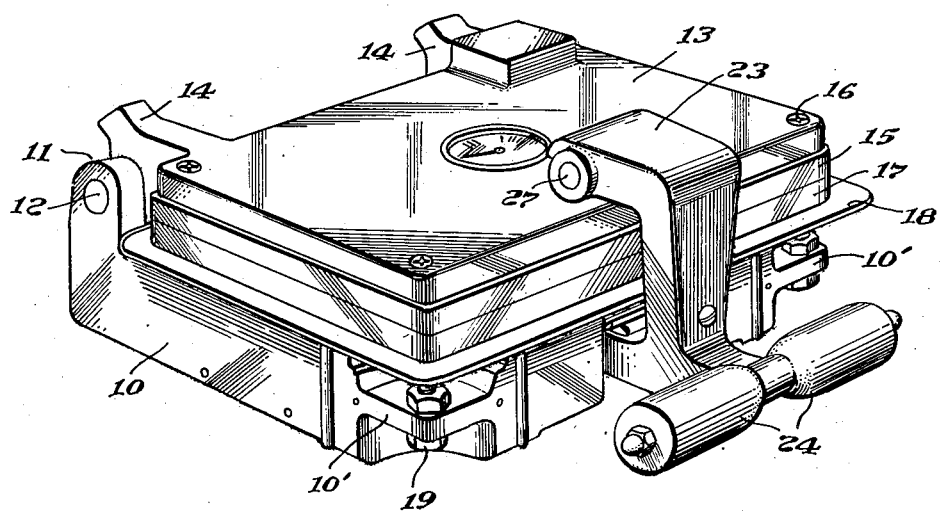
Figures 1 and 2 are perspective views of my baking unit as seen substantially from the front and rear respectively, the unit being closed.

I have indicated at 10 the base of my baking unit. Base 10 is preferably of cast, light-weight metal, such as aluminum, and is provided at its rear edge with two spaced upstanding lugs 11 (see Figs. 1 and 2) within which horizontal bearing pins 12 are retained.

I have indicated at 13 a holder for a top baking plate. Holder 13 is preferably of cast metal and is provided at its rear edge with spaced integral bearing members 14 adapted to engage the bearing pins 12 so that holder 13 may be swung from its closed position of Figs. 1 and 2 to its open position of Fig. 3.

Attached in any suitable manner to the under face of top plate holder 13 is a top baking plate 15, preferably of steel. If desired, plate 15 may be removably attached to top plate holder 13 by screws 16.

Figure 2:
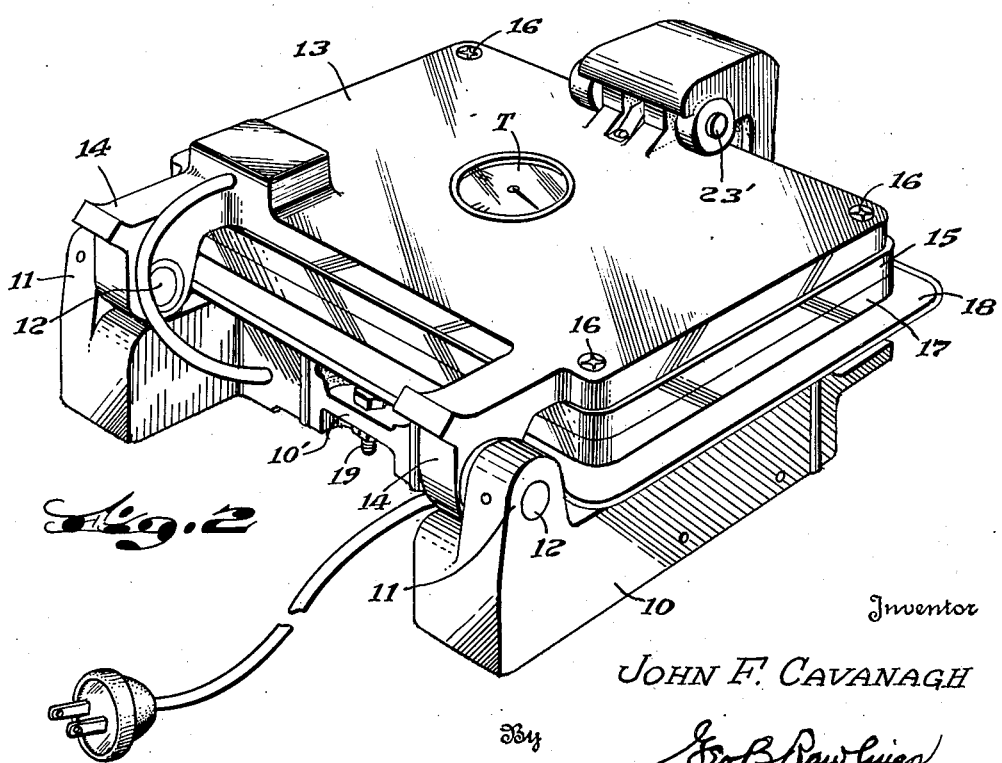
Figure 8:
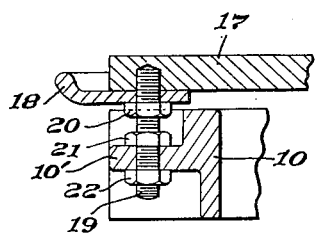
Figure 8 is a fragmentary sectional detail, particularly showing the means for adjusting the position of the lower baking plate with reference to the other parts of the baking unit and for holding such plate in its adjusted position.

Attached to base 10 is a complemental bottom baking plate 17. Plate 17 has attached thereto a frame or rim 18 of suitable width which completely surrounds said plate and is preferably provided with an upturned edge or lip. As here shown, plate 17 is attached to base 10 and frame or rim 18 is attached to the under face of plate 17 by means of a plurality of vertical studs 19 (see Fig. 8). Base 10 may be cut away, as shown in Figs. 1 and 2, to provide lateral webs or flanges 10' through which the studs 19 extend. Rim or frame 18 is fastened to the under face of plate 17 by nuts 20 on the studs 19 and the studs are clamped to the webs or flanges 10' of base 10 by means of nuts 21 and 22. Thus, the lower baking plate 17 and its rim or frame may be adjusted vertically with respect to base 10 and locked in any desired position of adjustment.

Figure 5:
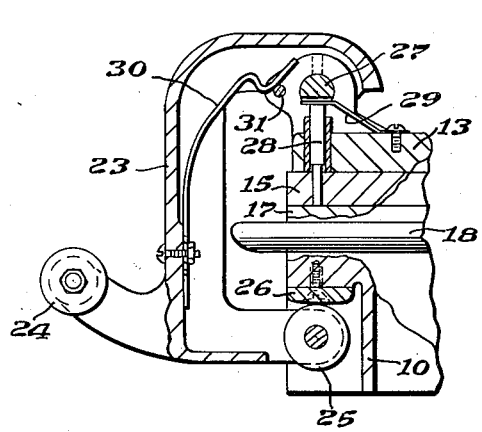
Figures 5 and 6 are fragmentary vertical sections through my baking unit and particularly showing the locking mechanism, Fig. 5 showing the parts in their locked position and Fig. 6 showing them in their unlocked position.

Suitable clamping means are provided for locking top plate holder 13 and top baking plate 15 in closed or baking position with reference to bottom baking plate 17 and its rim or frame 18. As here shown, I pivot to the front edges of top plate holder 13 a C-shaped clamp 23 which is provided with any suitable operating handle or handles 24. Suitably mounted upon the lower end of clamp 23 is a roll 25 adapted when the clamp is swung downwardly to its closed position (see Fig. 5) to engage a cooperating plate 26 fastened to the upper edge of base 10. Thus when the baking unit is closed, top baking plate 15 will be firmly clamped against the bottom baking plate 17 with, of course, a layer of batter interposed between said plates.

Figure 6:
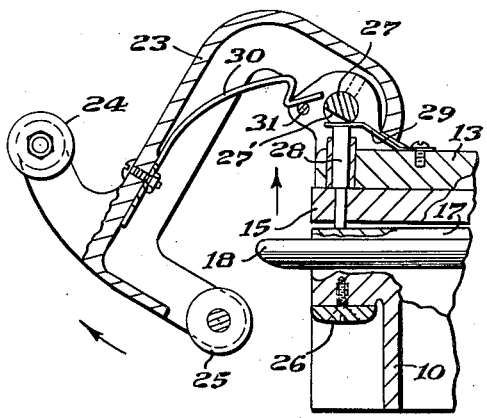

In practice it has been found desirable to initially separate or force apart said baking plates 15 and 17 before the top plate holder 13 is swung into the open position shown in Fig. 3. For this purpose the pivot pin 27 for clamp 23 is oscillatable with said clamp when the latter is operated and a kick-out pin 28 is slidably mounted in the top plate holder 13 and top baking plate 15, immediately beneath the pivot pin 27 and with its lower end flush with the under surface of top plate 15 when the latter is closed upon the bottom baking plate 17 (see Fig. 5). The under surface of pivot pin 27, where it is aligned with slidable pin 28, has a flat portion 27' and a strip 29 which may be of Phosphor bronze is mounted upon upper plate holder 13 with its free end disposed between this flatted portion of the pivot pin 27 and the upper end of the slidable pin 28 for the purpose of minimizing any clamping stress upon slidable pin 28 when the pivot pin oscillates. As will be seen by reference to Fig. 6, pivot pin 27 acts as a cam to force slide pin 28 downwardly against the upper surface of the top baking plate 17 upon the initial movement of clamp 23 towards its unlocked position preparatory to opening the baking unit. This accomplishes the desired slight separation of plates 15 and 17 before the opening operation actually occurs.

In order to provide a detent action and prevent clamp 23 from swinging downwardly when the baking unit is in the open position shown in Fig. 3, I fasten a flat spring 30 to the clamp 23 with its free end in engagement with a pin 31 mounted upon the top plate holder 13.

Figure 7:
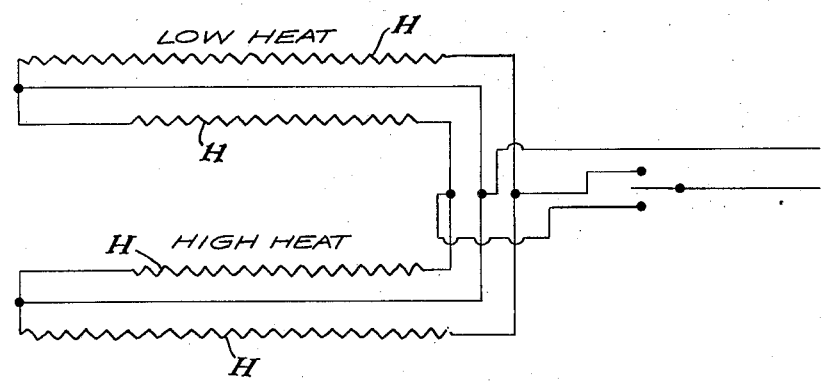
Figure 7 is a wiring diagram showing the arrangement of the electrical heating elements.

The baking plates 15 and 17 may be supplied with heat in any suitable manner. Where heated electrically, electrical heating elements indicated generally at H in the wiring diagram of Fig. 7 are suitably mounted in contact with said plates by means as shown. Preferably the arrangement is such as to provide either low heat or high heat.

In operating my improved baking unit, the heating current is switched on and when the baking plates have reached the desired baking temperature, as shown by any suitable temperature indicator T associated with the baking unit, a quantity of unleavened batter is poured onto the bottom baking plate 17 and the baking unit immediately closed and locked by the clamping means already described. Any excess batter which may ooze out around the margin of the baking plates is prevented from flowing down the sides of the base 10 by the upturned lip of the frame or rim 18, from which it may be removed as required. When the baking is completed, clamp 23 is swung upwardly in the direction of the arrow in Fig. 6 to carry its roller 25 out of engagement with the plate 26 and when the opening operation is completed the baked sheet of bread may be removed from the baking unit. In this opening movement of the clamp 23, the baking plates 15 and 17 are automatically forced slightly apart from each other by pin 28.

The under surface of the upper baking plate 15 may be provided with any suitable symbols or designs, indicated at D in Fig. 3, to be baked into the sheet of bread.

While I have described and illustrated a preferred embodiment of my invention, it will be understood that this disclosure is illustrative and not limiting and that the construction shown in the accompanying drawings may be variously modified within the spirit and scope of the invention as defined by the appended claims.

I claim:

1. A baking unit, comprising a base, a bottom baking plate mounted thereon, a top plate holder hinged to said base, a top baking plate complemental to said bottom baking plate and carried by said top plate holder, and means for locking said parts in closed position comprising a cam surface fixed beneath a portion of said base, a clamping member having a handle, and pivoted at its upper end to said top plate holder and having a locking portion at its lower end for frictional locking engagement with said cam surface as the clamping member is swung about its pivot and a knockout pin slidable through the top baking plate and into contact with the bottom baking plate for slightly separating said plates from one another upon movement of said clamping member toward its unlocked position.

2. A baking unit, comprising a base, a bottom baking plate mounted thereon, a top plate holder hinged to said base, a top baking plate complemental to said bottom baking plate and carried by said top plate holder, and means for locking said parts in closed position comprising a C-shaped clamping member having a handle, a pivot pin at the upper end of said clamping member for pivoting said member to the outer face of the top plate holder, a locking portion at the lower end of said clamping member for frictional locking engagement beneath a portion of said base, and a knock-out pin slidable through said top plate and top plate holder and having its upper end disposed for contact by the pivot pin for said clamping member when said member is swung towards its unlocked position whereby the pin is moved downwardly into contact with the upper face of the bottom baking plate to cause the baking plates to separate slightly from each other.

3. The structure of claim 2 and means to limit the movement of the handle upwardly whereupon when the clamping member reaches said limit, the top plate holder is lifted from closed position.

4. The structure of claim 2, and a detent for preventing the clamping member from accidentally swinging downwardly towards its locking position when the parts of the baking unit are in their open position.

5. The structure of claim 4, said detent comprising a spring member fastened at one end to the inner face of the clamping member and a pin carried by the top plate holder to be engaged by the free end of said detent.

6. A baking unit, comprising a base, a bottom baking plate mounted thereon, a top plate holder hinged near its rear edge to said base, a top baking plate complemental to said bottom baking plate and carried by said top plate holder, means for locking said parts in closed position comprising a C-shaped clamping member having a handle, a pivot pin at the upper end of said clamping member for pivoting said member to the top plate holder, a locking portion in the lower end of said clamping member for frictional locking engagement beneath a portion of said base, said pivot pin and locking portion being so located that when the clamping member is in locked position the locking portion thereof is substantially in line with said pivot pin, and means actuated by said pivot pin for effecting a slight separation of the top and bottom baking plates when the clamping member is swung towards its unlocked position.

JOHN F. CAVANAGH.

REFERENCES CITED

The following references are of record in the file of this patent:

UNITED STATES PATENTS

| Number | Name | Date |
|---|---|---|
| 474,601 | Horan | May 10, 1892 |
| 750,445 | Forcke | Jan. 26, 1904 |
| 1,257,513 | Messmer | Feb. 26, 1918 |
| 1,687,662 | Fay | Oct. 16, 1928 |
| 1,950,385 | Burch | Mar. 13, 1934 |
| 1,969,361 | Fajen | Aug. 7, 1934 |

FOREIGN PATENTS

| Number | Country | Date |
|---|---|---|
| 251,206 | Germany | Feb. 16, 1911 |
| 440,046 | Germany | Jan. 27, 1927 |